United States Patent [19]
Leidner

[11] Patent Number: 4,810,431
[45] Date of Patent: Mar. 7, 1989

[54] METHOD OF MANUFACTURING PLASTIC PARTICLES FOR A PARTICLE DISPLAY

[75] Inventor: Jacob Leidner, Ontario, Canada

[73] Assignee: Ontario Research Foundation, Ontario, Canada

[21] Appl. No.: 53,471

[22] Filed: May 26, 1987

[30] Foreign Application Priority Data

May 23, 1986 [GB] United Kingdom ............... 8612691

[51] Int. Cl.$^4$ ............................................. B22D 11/01
[52] U.S. Cl. ..................................... 264/15; 264/143; 428/402; 428/900
[58] Field of Search ............... 428/402, 403, 900, 329; 264/15, 141, 142, 143

[56] References Cited

U.S. PATENT DOCUMENTS

| | | | |
|---|---|---|---|
| 3,505,434 | 4/1970 | Battaerd | 264/15 |
| 3,892,834 | 7/1975 | Pritchard | 264/142 |
| 3,920,783 | 6/1975 | Hara et al. | 264/143 |
| 3,982,334 | 9/1976 | Tate | 428/900 |
| 4,226,909 | 10/1980 | Kanten | 428/403 |
| 4,251,201 | 2/1981 | Krysiak | 264/142 |

FOREIGN PATENT DOCUMENTS 1150847 6/1967 United Kingdom ............... 264/140

*Primary Examiner*—George F. Lesmes
*Assistant Examiner*—J. B. Monroe

[57] ABSTRACT

A particle display comprises a plurality of particles which in an electrical field rotate to expose either their white or black surface depending upon the polarity of the field. The particle display can be used for a flat panel ambient-illuminated numeric, alpha-numeric and other forms of visual displays.

8 Claims, 1 Drawing Sheet

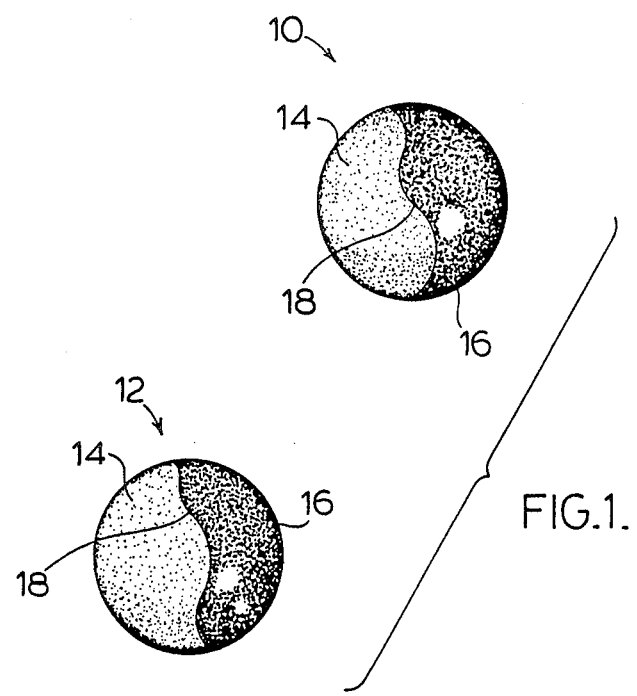

METHOD OF MANUFACTURING PLASTIC PARTICLES FOR A PARTICLE DISPLAY

FIELD OF THE INVENTION

This invention relates to particle displays and more particularly to the method of manufacturing particles used in the display.

BACKGROUND OF THE INVENTION

Phillips Electronics of The Netherlands developed a display using small magnetized spheres coated half white and half black. In a magnetic or electronstatic field, these particles rotate to expose a white or black surface depending on the polarity of the field. The display can be used for flat panel ambient-illuminated numeric, alpha-numeric and other forms of visual displays, such as television screens. The magnetized spheres which make up the display have been made by Phillips Electronics by compounding polyethylene with magnetite. The polymer composition is then processed to produce fine particles by centrifugal spraying of the polymer melt. The magnetite particles in the particles of polyethylene are magnetized. The particles are then aligned in a magnetic field to produce a single layer of particles. With the particles held in the single layer, aluminum is vacuum deposited on the upper half of the surface of the spherical particles to coat each particle with a white coating. The remaining uncoated portion of the sphere, as compounded with magnetite, has a dark or black appearance. This method of production of the spheres is very tedious and difficult to adopt for mass production.

SUMMARY OF THE INVENTION

According to an aspect of this invention, a generally spherical plastic particle is provided which is composed of first and second substantially hemi-spherical portions of two distinct colors. The first portion includes a material which imparts a predetermined electrical property thereto and which is different from electrical properties of the second portion.

According to another aspect of the invention, a process for making the generally spherical plastic particles is provided. The process comprises adding to a heated liquid bath non-spherical particles consisting of a first layer of plastic having a first color. The first layer includes a material which imparts a predetermined electrical property thereto. A second layer of plastic has a second color, the second layer including a material which imparts electrical properties thereto different from the first layer. The temperature is established in the bath which is sufficient to cause melting of the first and second layers of plastic. An anti-agglomerating agent is present in the bath to preclude melting particles of plastic adhering to one another. The melting particles are allowed to form spheres in the bath. The spheres are solidified in the bath and the spheres removed therefrom.

BRIEF DESCRIPTION OF THE DRAWINGS

FIG. 1 of the drawings shows in magnified form spheres made in accordance with this invention for use in magnetic particle displays and the like.

DETAILED DESCRIPTION OF THE PREFERRED EMBODIMENTS

The spheres, as prepared in accordance with this invention, may be incorporated into flat display panels in accordance with standard procedure. Such procedure involves encapsulating each sphere in one manner or another to form individual cells. The individual cells are then incorporated into a display. There are various examples of such techniques, such as disclosed in U.S. Pat. No. 4,143,103 assigned to Xerox Corporation. In that patent, the difference in surface colors for the two hemispheres of the spherical particle provide the necessary difference in electrical properties. It is disclosed in that patent that, when particles are dispersed in a dielectric liquid, the particles acquire an electrical charge related to the Zeta potential of their surface coating. Due to the optical anisotropy of the particles by virtue of the different surface coatings, then the particles present different Zeta potentials with the result that the particles have an electrical anisotropy in addition to their optical anisotropy. Under the action of an addressing electric field, such as provided by conventional matrix addressing, selected ones of the electrically anisotropic particles are made to rotate or otherwise shift their orientation within their cavities to provide a display by the selective adsorption and reflection of ambient light. As previously noted, it is possible to provide the desired electrical property in each particle by incorporating a magnetic material therein. Hence, it is understood that by the use of the term electrical property, it is intended to cover not only electrical charges on the particle, but also any other form of electrical effect including a magnetic field.

The invention is applicable to forming spheres from any form of suitable plastic which can provide for the compatible marrying of one colored material to a different colored material, where one of the materials optionally contains magnetite. There are available many suitable thermoplastic polymers which fall into this category such as polyolefins of polyethelene and polypropylele or, polyamides and acrylics. The selected polymer should have a relatively low viscosity in the molten state so as to assume the shape of a sphere within a relatively short time frame when the particles are immersed in a heated bath.

The prepared particles, according to an aspect of the invention, consist of one layer of polymer of one color and a second layer of polymer of another color. One of the layers may contain magnetite. The particles are charged into a tank containing a bath medium which is of a sufficiently high temperature to cause a melting of the particles. To prevent agglomeration of melted particles when in the bath, an additive which prevents particle agglomeration is either present in the bath or coated onto the particles before the particles are introduced to the bath. Stirring of the bath may be provided to circulate the particles. As the particles melt, the anti-agglomeration material adheres to the melted spherical surfaces of the particles and prevents adjacent coated particles from agglomerating to form larger particles. Suitable anti-agglomeration powders include clays, such as kaolin clays, which may be coated on the dry particles before introduction to the bath or the kaolin clay powder may be introduced to the bath before the particles of polymer are charged into the bath. Other suitable anti-agglomeration additives include surfactants which perform the same function in preventing agglomeration of the particles when they are present in the bath.

Once the particles have formed spheres, the bath is cooled to room temperature to solidify the particles in their spherical form. The particles are then filtered from the bath or in some other manner removed from the bath for further treatment and set up for use in displays.

According to one aspect of the invention, the particles may be prepared by coextruding a fibre consisting of a semi-circular layer of polyethylene pigmented white and a black layer of polyethylene containing magnetite. The resultant fiber is chopped into fine particles to provide a layer containing the white pigment married to a layer containing the magnetite. The fibre particles have an aspect ratio; i.e. fiber length to diameter, in the range of 0.5 up to 5.0. The extruded diameters may be in the range of 10 microns up to 10 millimeters depending upon the desired size of the sphere to be formed from the particle. The particles may then be mixed with clay or other anti-agglomeration material. The coated polyethylene particles are charged into a stirred tank reactor containing oil or other liquid preheated to approximately 120° C. The particles are mixed for approximately ten minutes in the bath, during which time the particles form spheres without agglomerating with other adjacent spheres. The bath is then cooled to room temperature to solidify the particles. The bath medium is discharged and the particles are filtered from the medium.

It is appreciated that the plastic for each layer may be different. In the coextrusion of the different plastics, it may not be necessary to use an adhesive to bond the layers together, because the layers may still fuse. However in situations where the layers do not form a proper bond at their interface, a suitable adhesive may be employed in the coextrusion process.

Rather than coextruding a fiber, it is appreciated that sheet may be coextruded having an upper layer of one pigmented color and a bottom layer of another pigmented color optionally containing the magnetite. To simulate coextruding of the sheet and as an alternative approach to making sheet, polyethylene may be compounded with magnetite and compression molded to produce approximately one-half mm thick sheet. Polyethylene may also be compounded with titanium dioxide (white pigment) and compression molded to produce a similar one-half mm thick sheet. Both sheets may then be pressed and bonded together at approximately 130° C. From the sheet, small cubes may be severed which are approximately ½ mm ×½ mm ×½ mm. Such small cubes may be either coated with a koalin clay or other anti-agglomerative additive and introduced to a heated bath. Alternatively, the anti-agglomerative material may also be introduced to the bath. According to this particular embodiment, one gram of particles was mixed with approximately 0.3 grams of koalin clay. The coated particles were then introduced to a silicone oil bath preheated to 120° C. and into which the particles were added with stirring. After about ten minutes of heating and the particles had developed into spheres, the heating was stopped and the liquid allowed to cool. The particles were then filtered from the bath liquid and the coating removed from the particles for subsequent treatment and use in displays.

FIG. 1 shows the resulting spheres 10 and 12. Each sphere is essentially round and has a distinct white hemispherical portion 14 compared to a distinct black hemispherical portion 16. The black hemispherical portion contains the magnetite. Each particle has a slightly warped interface 18 formed during the melting of the non-spherical particle. It is appreciated that for fibers when the aspect ratio is approximately 1.0, the resultant spheres have an essentially planar interface.

The process, according to this invention, provides in a rapid efficient manner spherical particles having a hemispherical portion of different electrical properties for use in various types of particle displays.

Although preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A process for making a generally spherical plastic particle composed of first and second substantially hemispherical portions of two distinct colors, the first portion including a material which imparts a predetermined electrical property thereto which is different from electrical properties of the second portion, the process comprising adding to a heated liquid bath non-spherical particles consisting of a first layer of plastic having a first color, said first layer including a material which imparts a predetermined electrical property thereto, a second layer of plastic having a second color, said second layer including a material which imparts electrical properties thereto different from said first layer, said non-spherical particles having been formed by extruding said first and second layers of plastic in the shape of an elongate rod having said first and second layers adjoining one another centrally of and along said rod, said rod having been cut into predetermined lengths where the resultant aspect ratio of fiber length to diameter is in the range of 0.5 up to 5.0, establishing in said bath a temperature which is sufficient to cause melting of said first and second layers of plastic, an anti-agglomerating agent, being present in said bath to preclude melting particles of plastic adhering to one another, allowing such melting particles to form spheres in said bath, solidifying said spheres in said bath and removing said spheres from said bath.

2. A process of claim 1, wherein said bath is an oil bath heated to a sufficient temperature to cause formation of said spheres, said oil bath being subsequently cooled to solidify said formed spheres.

3. A process of claim 1, wherein said two layers of plastic are polyethylene.

4. A process of claim 1, wherein said first layer has said electrical property imparted therein by incorporating into said first layer a magnetizable material.

5. A process of claim 4, wherein said magnetizable material is magnetite.

6. A process of claim 1, wherein said anti-agglomerating agent is selected from the group consisting of powdered clay and a surfactant.

7. A process of claim 6, wherein said anti-agglomerating agent is dispersed throughout said bath prior to introducing said non-spherical particles thereto.

8. A process of claim 6, wherein said anti-agglomerating agent is coated on the surfaces of said particles prior to the introduction of said particles to said bath.

* * * * *